(12) United States Patent
Qu et al.

(10) Patent No.: US 12,404,647 B2
(45) Date of Patent: Sep. 2, 2025

(54) INCLINATION ANGLE CONTROL INSTRUMENT FOR SCREW ANCHOR INSTALLATION

(71) Applicant: Henan University of Urban Construction, Pingdingshan (CN)

(72) Inventors: Songzhao Qu, Pingdingshan (CN); Bo Zhang, Pingdingshan (CN); Shuang Wang, Pingdingshan (CN); Guanghui Liu, Pingdingshan (CN); Tong Xu, Pingdingshan (CN)

(73) Assignee: Henan University of Urban Construction, Pingdingshan (CN)

( * ) Notice: Subject to any disclaimer, the term of this patent is extended or adjusted under 35 U.S.C. 154(b) by 385 days.

(21) Appl. No.: 18/121,917

(22) Filed: Mar. 15, 2023

(65) Prior Publication Data
US 2023/0358008 A1 Nov. 9, 2023

(30) Foreign Application Priority Data
May 9, 2022 (CN) .......................... 202210499310.7

(51) Int. Cl.
*E02D 13/04* (2006.01)
(52) U.S. Cl.
CPC ................................... *E02D 13/04* (2013.01)
(58) Field of Classification Search
CPC ............ E02D 13/04; E02D 7/22; E02D 5/801
See application file for complete search history.

(56) References Cited

U.S. PATENT DOCUMENTS

| | | | | | |
|---|---|---|---|---|---|
| 2,042,443 | A | * | 5/1936 | Buckstone | F16M 11/18 248/404 |
| 4,126,008 | A | * | 11/1978 | Dixon | E21B 41/08 405/207 |
| 2011/0079686 | A1 | * | 4/2011 | Palik | F41A 23/06 248/161 |
| 2015/0110564 | A1 | * | 4/2015 | West | E02D 13/005 405/227 |
| 2017/0121927 | A1 | * | 5/2017 | Hoyt | E02D 5/801 |
| 2019/0338549 | A1 | * | 11/2019 | McDermott | E02D 5/801 |

\* cited by examiner

*Primary Examiner* — Amber R Anderson
*Assistant Examiner* — Stacy N Lawson
(74) *Attorney, Agent, or Firm* — Kirk A. Wilson; Joseph T. Guy; Patent Filing Specialist Inc.

(57) ABSTRACT

An inclination angle control instrument for screw anchor installation is provided, relates to the technical field of geotechnical engineering. The inclination angle control instrument for screw anchor installation includes a triangular base and side plates hinged to three sides of the triangular base respectively. A platform assembly for placing a screw anchor clamp is arranged above the triangular base, transmission assemblies are arranged on the platform assembly, each of the transmission assemblies drives a corresponding one of the side plates to rotate on the triangular base. The inclination angle control instrument for screw anchor installation can be spread and retracted more conveniently, thereby improving the working efficiency of the inclination angle control instrument for screw anchor installation.

18 Claims, 5 Drawing Sheets

INCLINATION ANGLE CONTROL INSTRUMENT FOR SCREW ANCHOR INSTALLATION

CROSS REFERENCE TO RELATED APPLICATION

This patent application claims the benefit and priority of Chinese Patent Application No. 202210499310.7, entitled "INCLINATION ANGLE CONTROL INSTRUMENT FOR SCREW ANCHOR INSTALLATION" filed on May 9, 2022, the disclosure of which is incorporated by reference herein in its entirety as part of the present application.

TECHNICAL FIELD

The present disclosure belongs to the technical field of geotechnical engineering, and in particular relates to an inclination angle control instrument for screw anchor installation.

BACKGROUND ART

Screw anchor foundations are increasingly widely used in electricity transmission line engineering, and screw anchors are important components of this type of foundation. The screw anchor is a pile, and is generally formed by welding an anchor rod made of a steel pipe material and a steel rotary blade. The screw anchor can be screwed and inserted into a certain depth underground, and is mainly suitable for inserting into the strata such as cohesive soil and sand. The screw anchors have the advantages of high construction efficiency, quick exertion of bearing capacity thereof, and small disturbance to the environment.

The Chinese patent No. CN109826193A discloses an inclination angle control instrument for screw anchor installation. The inclination angle control instrument for screw anchor installation includes a platform assembly, a clamping apparatus and a support assembly. The clamping apparatus and the support assembly are respectively located at upper and lower sides of the platform assembly. The platform assembly includes a hinge connected to the support assembly and a connecting member movably connected to the clamping apparatus.

However, in the described technical solution, the support assembly of the instrument needs to be installed manually firstly and fixed on the ground during use. However, the instrument is cumbersome to use from the above process, and this instrument cannot be retracted for storing after use.

SUMMARY

An object of the present disclosure is to provide an inclination angle control instrument for screw anchor installation, so as to solve a following problem in the prior art. A support assembly of the instrument needs to be installed manually firstly and fixed on the ground during use, so the instrument is troublesome to use, and the instrument cannot be retracted for storing after use.

To achieve the foregoing objective, the present disclosure provides the following technical solutions. An inclination angle control instrument for screw anchor installation, the inclination angle control instrument including: a triangular base and side plates hinged to three sides of the triangular base respectively, where a platform assembly for placing a screw anchor clamp is arranged above the triangular base, transmission assemblies are arranged on the platform assembly, each of the transmission assemblies drives a corresponding one of the side plates to rotate on the triangular base, a driving device for driving the transmission assemblies to operate is provided inside the triangular base, and an output end of the driving device extends to an interior of the platform assembly and is connected to each of the transmission assemblies.

In order to enable the inclination angle control instrument for screw anchor installation to have a transmission function, in some embodiments, each of the transmission assemblies may include a first sleeve hinged to a corresponding one of the side plates, the first sleeve may be in a threaded connection with a second sleeve within an interior of the first sleeve, and a rotating column may be rotatably provided within the second sleeve in a damping manner, one end of the rotating column which is adjacent to the platform assembly may be provided with a universal transmission assembly, and the universal transmission assembly may be provided with a driven bevel gear, the output end of the driving device may be provided with a driving bevel gear engaged with the driven bevel gear.

In order to enable the inclination angle control instrument for screw anchor installation to have a transmission function, in some embodiments, the universal transmission assembly may include a first rotating disc fixedly connected to the driven bevel gear, a second rotating disc may be fixedly connected to the rotating column, and each of the first rotating disc and the second rotating disc may be provided with protruding columns, the protruding columns of the first rotating disc and the protruding columns of the second rotating disc may be arranged in a staggered manner, and a rotating frame for connecting with the second rotating disc may be rotatably connected to the platform assembly.

In order to enable the inclination angle control instrument for screw anchor installation to have a function of adjusting damping strength, in some embodiments, an external thread may be provided on one end of the rotating column which is adjacent to the universal transmission assembly, and an adjusting nut for adjusting a damping intensity between the second sleeve and the rotating column may be in a threaded connection with the external thread.

In order to enable the inclination angle control instrument for screw anchor installation to have a function of fixing the instrument, in some embodiments, for each of the side plates, the side plate may be provided with a small screw anchor which is capable of inserting into ground, a first gear may be fixedly connected to the small screw anchor, a second gear engaged with the first gear may be provided on the side plate; the second gear may be provided with a sliding column by means of a universal joint, the first sleeve may be rotatably connected with a rotating drum within the first sleeve, the rotating drum drives the sliding column to rotate via a key fit therebetween and enable the sliding column to slide inside the rotating drum, one end of the rotating drum which is away from the universal joint may be fixedly connected with protruding blocks, and one end of the rotating column which is away from the universal transmission assembly may be fixedly connected with a limiting block, the limiting block may be provided with a latex pad, the latex pad moves closer towards the protruding blocks via the limiting block, so that the protruding blocks press and deform the latex pad.

In order to enable the inclination angle control instrument for screw anchor installation to have a function of accommodating small screw anchor, in some embodiments, the triangular base may be provided with retracting mechanisms each for driving the small screw anchor of a corresponding one of the side plates to be retracted into an interior of the corresponding one of the side plates, each of the retracting mechanisms may include a rotating member rotatably connected to the first gear, a bottom of the rotating member may be provided with a protrusion limiting a position of the rotating member in an up-down direction of the first gear, a third gear may be provided in a middle of the rotating member, each of the side plates may be slidably connected with a rack engaged with the third gear, a connecting rod for pushing the rack to slide may be arranged on the triangular base, a threaded column may be arranged above the rotating member, each of the side plates may be fixedly connected with a frame, and the threaded column may be in a threaded connection with the frame.

In order to enable the inclination angle control instrument for screw anchor installation to have a function of guiding the rack, in some embodiments, each of the side plates may be fixedly connected with a smooth column, and the rack may slide on the smooth column.

In order to enable the inclination angle control instrument for screw anchor installation to have a function of keeping the instrument horizontal, in some embodiments, the platform assembly may be provided with a level meter.

In order to enable the inclination angle control instrument for screw anchor installation to have a function of sealing the top, in some embodiments, one end, which is away from the triangular base, of one of the side plates may be fixedly connected with a top plate.

In some embodiments, the driving device may be an electric motor.

Compared with the prior art, the beneficial effects of the present disclosure are the followings.

1. When in use, the inclination angle control instrument for screw anchor installation is first placed in a working position. The rotation of the driving device can drive the transmission assemblies to operate, so that the operation of the transmission assemblies can push three side plates to spread. The three side plates are brought into be in contact with the ground and support the inclination angle control instrument for screw anchor installation. After the inclination angle control instrument for screw anchor installation is used, the transmission assemblies can be pulled by means of the reverse rotation of the driving device to drive the side plates to approach each other. The three side plates form a triangular upright column, so that the inclination angle control instrument for screw anchor installation can be retracted for storage. The inclination angle control instrument for screw anchor installation can be spread and retracted more conveniently, thereby improving the working efficiency of the inclination angle control instrument for screw anchor installation.

2. During the use of the inclination angle control instrument for screw anchor installation, when the side plates contact with the ground, the rotating members can be driven to rotate through cooperation between the respective connecting rods and the respective racks. The threaded columns can be driven to rotate through the rotation of the respective rotating members, and the small screw anchors can be driven to move downwards by the rotation of the respective threaded columns. The second gears can be driven to rotate by the rotation of the respective transmission assemblies, the first gears can be driven to rotate via the rotation of the respective second gears, and the first gears drive the respective small screw anchors to rotate. Thus, the small screw anchors can be penetrated into the ground, and the inclination angle control instrument for screw anchor installation is fixed by the small screw anchors, so that the overturning of the instrument is avoided, and the stability of the inclination angle control instrument for screw anchor installation is improved.

BRIEF DESCRIPTION OF THE DRAWINGS

The accompanying drawings are used to provide further understanding of the present disclosure, constitute a part of the description, and are used to explain the present disclosure together with the embodiments of the present disclosure, but do not constitute a limitation to the present disclosure.

Figure 1:
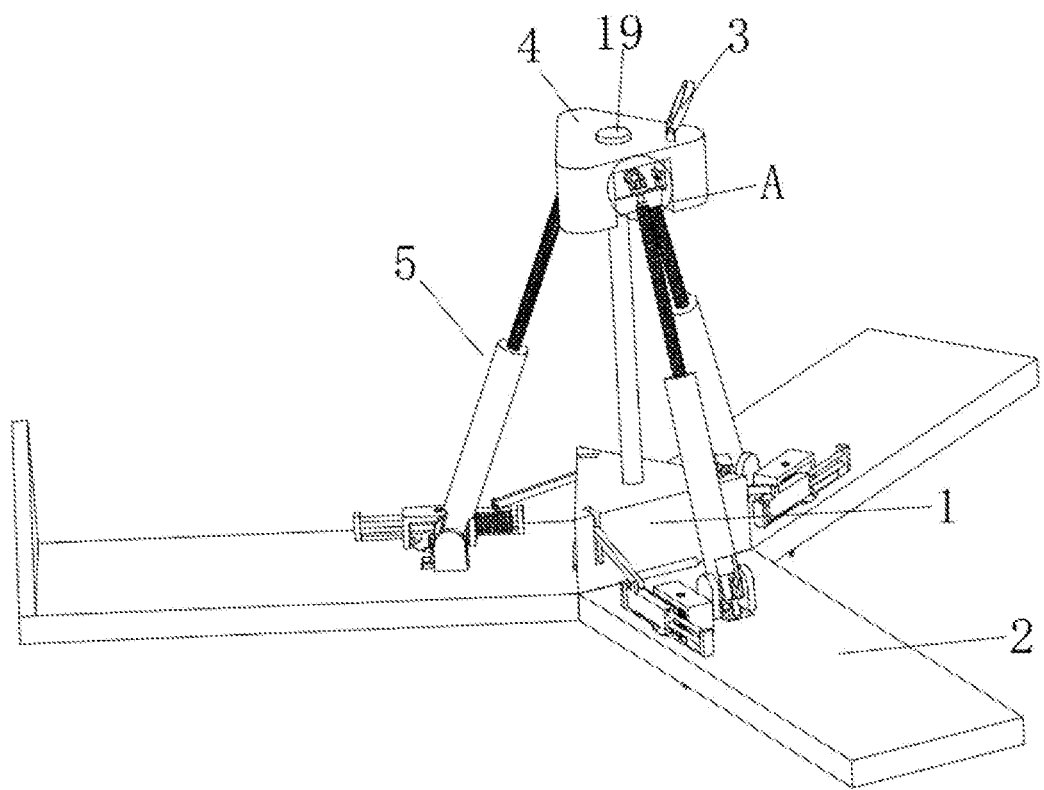
FIG. 1 is a schematic structural diagram according to embodiments of the present disclosure.

List of reference characters: 1 triangular base; 2 side plate; 3 screw anchor clamp; 4 platform assembly; 5 transmission assembly; 501 first sleeve; 502 second sleeve; 503 rotating column; 504 universal transmission assembly; 5041 first rotating disc; 5042 second rotating disc; 5043 protruding column; 5044 rotating frame; 505 driven bevel gear; 506 driving bevel gear; 6 driving device; 7 adjusting nut; 8 small screw anchor; 9 universal joint; 10 sliding column; 11 rotating drum; 12 protruding block; 13 limiting block; 14 latex pad; 15 first gear; 16 second gear; 17 retracting mechanism; 1701 rotating member; 1702 protrusion; 1703 third gear; 1704 rack; 1705 connecting rod; 1706 threaded column; 1707 frame; 18 smooth column; 19 level meter; 20 top plate.

DETAILED DESCRIPTION OF THE EMBODIMENTS

The following clearly and completely describes the technical solutions in embodiments of the present disclosure in combination with accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall belong to the scope of protection of the present disclosure.

Figure 2:
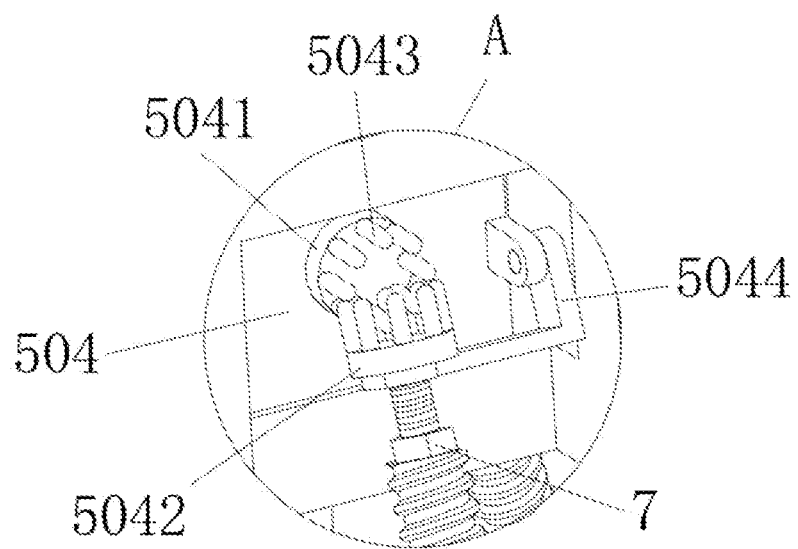
FIG. 2 is a schematic enlarged diagram of a structure at detail A in FIG. 1.
Figure 3:
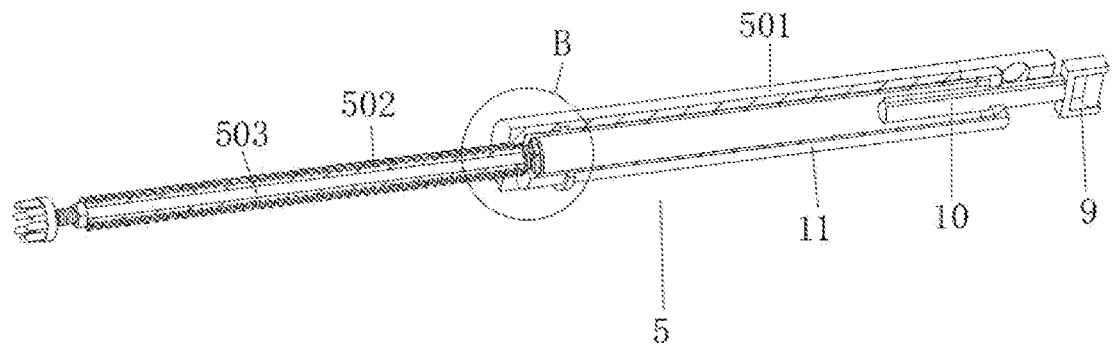
FIG. 3 is a schematic structural diagram of a transmission assembly according to embodiments of the present disclosure.
Figure 4:
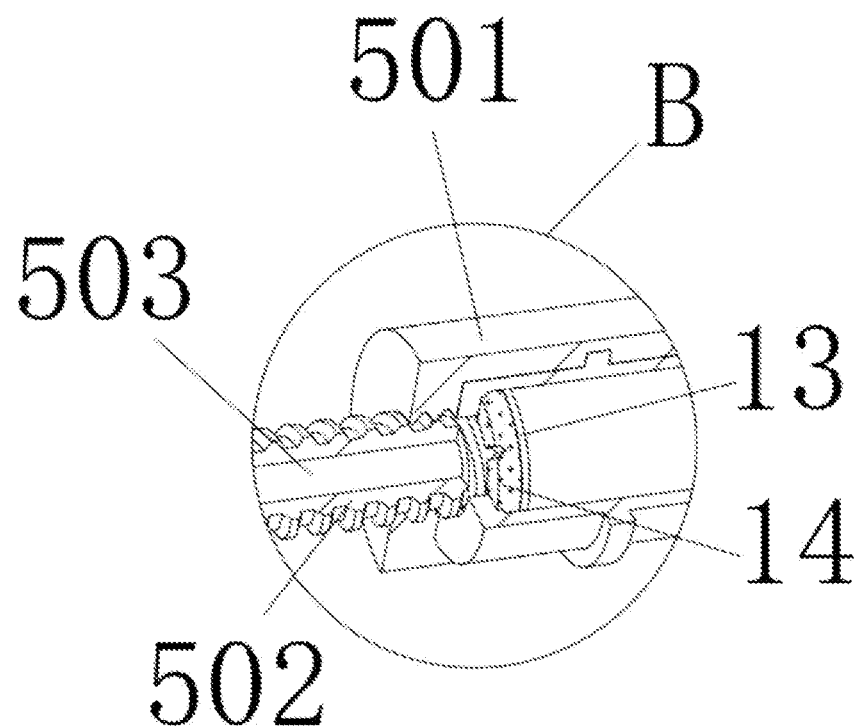
FIG. 4 is a schematic enlarged diagram of a structure at detail B in FIG. 3.
Figure 5:
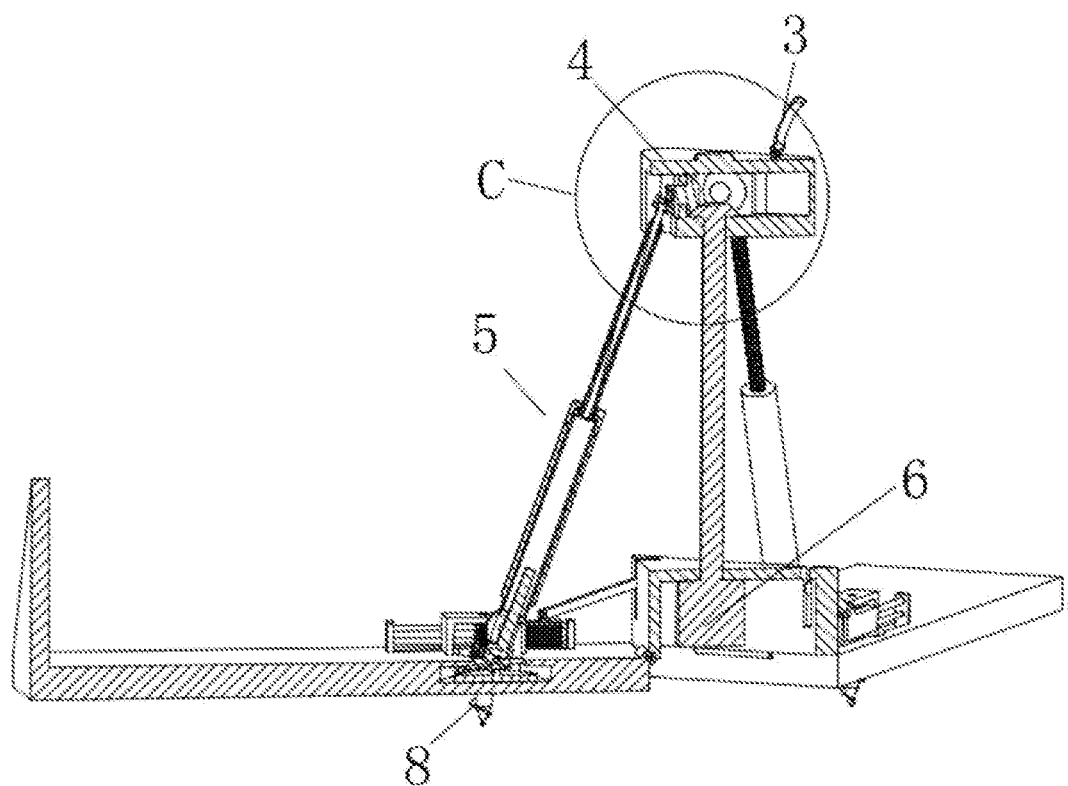
FIG. 5 is an axonometric section view according to embodiments of the present disclosure.
Figure 6:
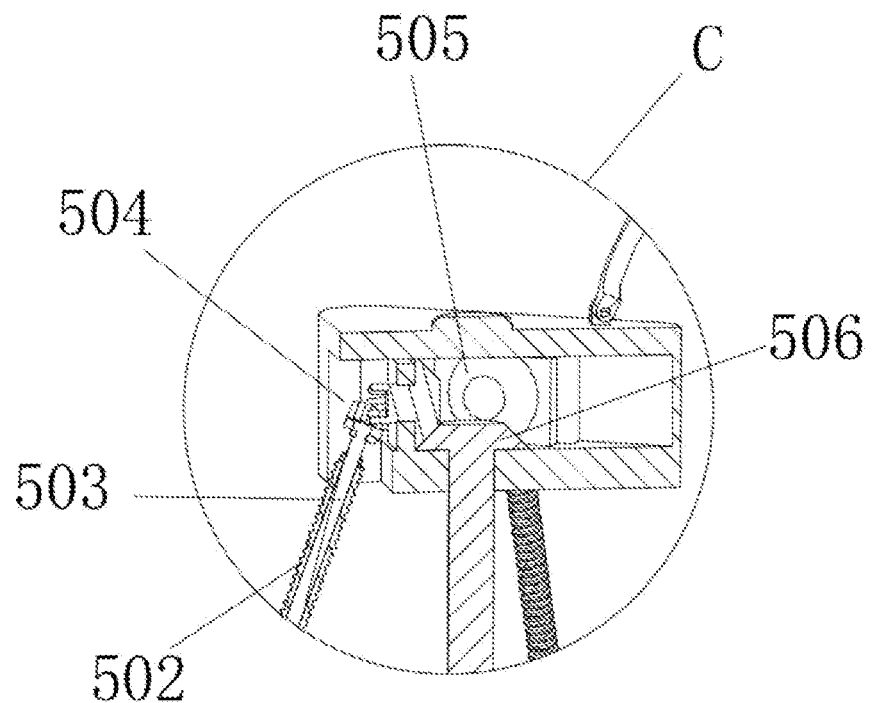
FIG. 6 is a schematic enlarged diagram of a structure at detail C in FIG. 5.
Figure 7:
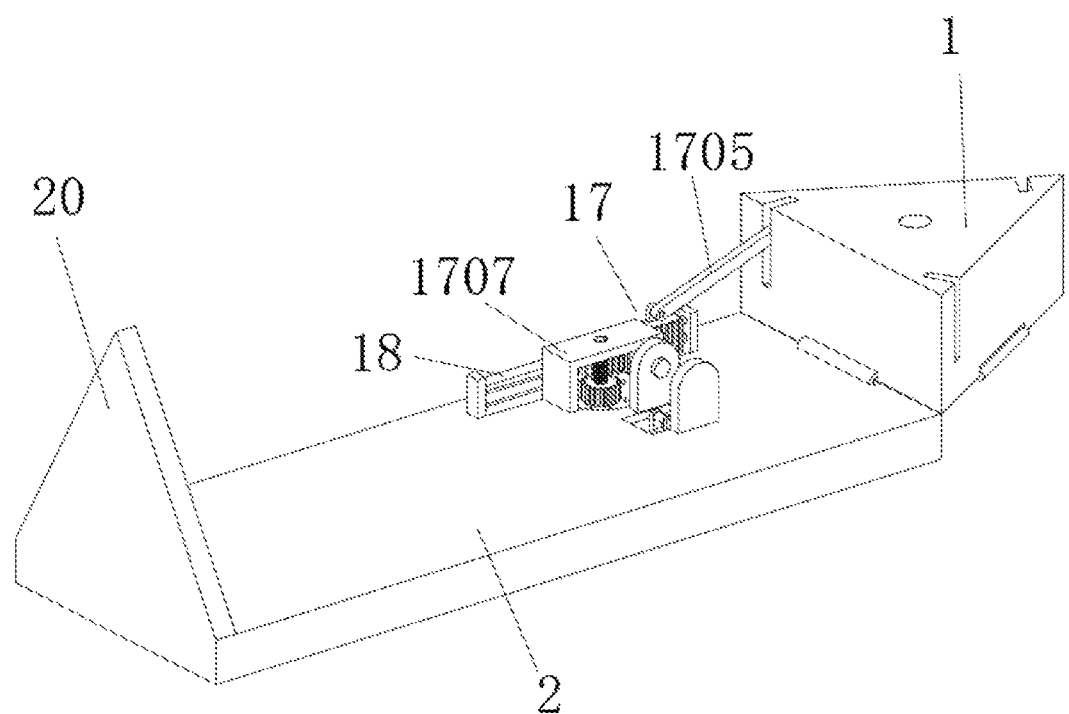
FIG. 7 is a schematic structural diagram of a compression mechanism according to embodiments of the present disclosure.
Figure 8:
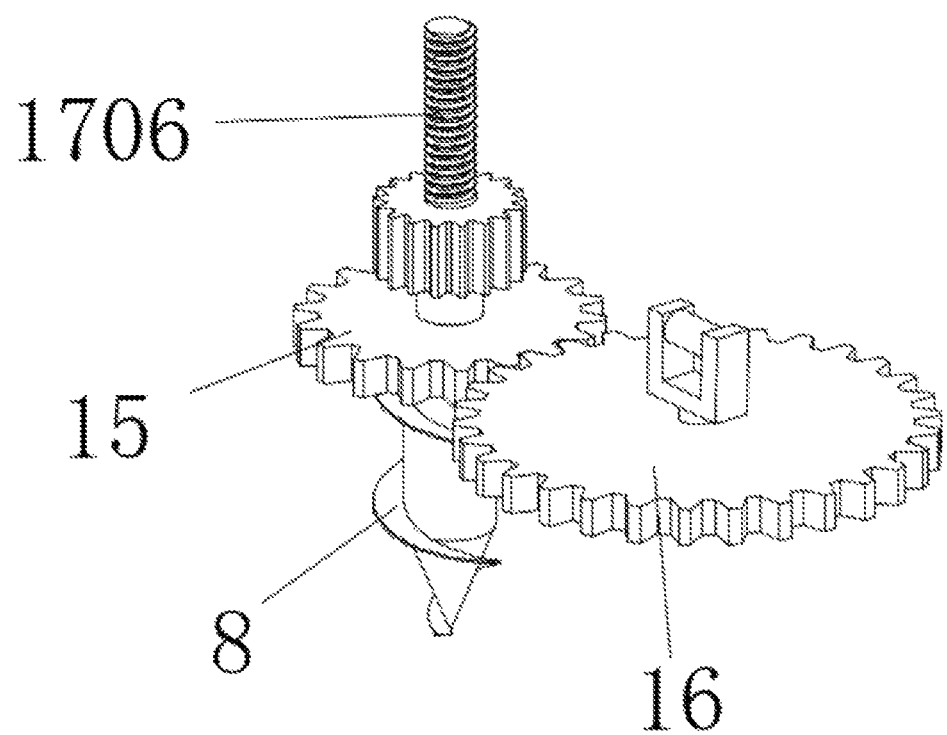
FIG. 8 is a schematic structural diagram of a first gear and a second gear according to embodiments of the present disclosure.
Figure 9:
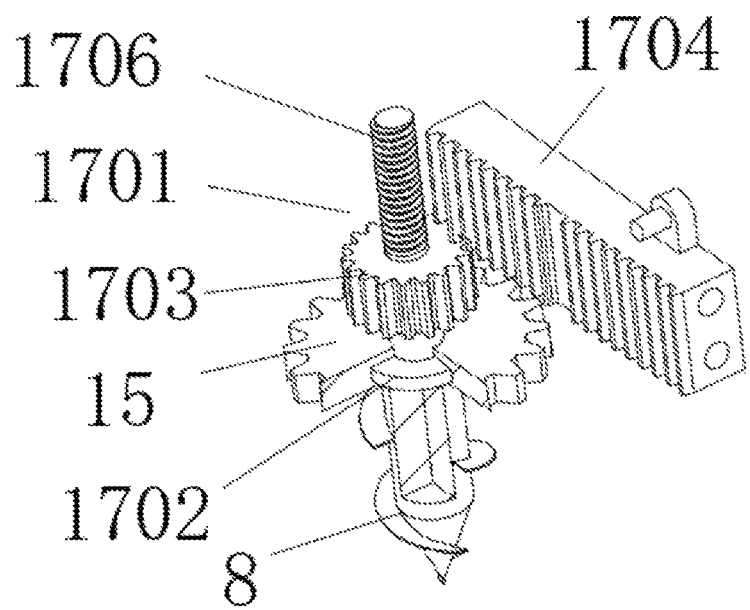
FIG. 9 is a schematic structural diagram of a retracting mechanism according to embodiments of the present disclosure.
Figure 10:
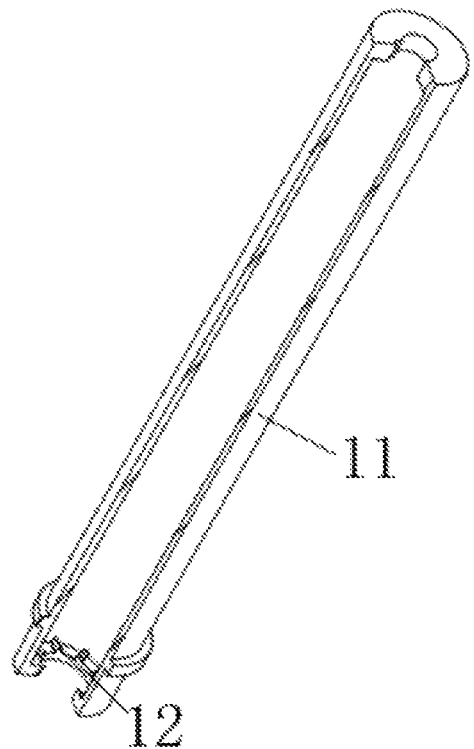
FIG. 10 is a schematic structural diagram of a rotating drum according to embodiments of the present disclosure.

Referring to FIGS. 1-10, the present disclosure provides the following technical solutions. An inclination angle control instrument for screw anchor installation includes a triangular base 1 and side plates 2 hinged to three sides of the triangular base 1 respectively. A platform assembly 4 for placing a screw anchor clamp 3 is arranged above the triangular base 1. Transmission assemblies 5 are arranged on the platform assembly 4, each of the transmission assemblies drives a corresponding one of the side plates 2 to rotate on the triangular base 1. A driving device 6 for driving the transmission assemblies 5 to operate is provided inside the triangular base 1, and an output end of the driving device 6 extends to an interior of the platform assembly 4 and is connected to each of the transmission assemblies 5.

In embodiments of the disclosure, when in use, the inclination angle control instrument for screw anchor installation is first placed in a working position. The rotation of the driving device 6 can drive the transmission assemblies 5 to operate, so that the operation of the transmission assemblies 5 can push three side plates 2 to spread. The three side plates 2 are brought into be in contact with the ground and support the inclination angle control instrument for screw anchor installation. After the inclination angle control instrument for screw anchor installation is used, the transmission assemblies 5 can be pulled by means of the reverse rotation of the driving device 6 to drive the side plates 2 to approach each other. The three side plates 2 form a triangular upright column, so that the inclination angle control instrument for screw anchor installation can be retracted for storage. The inclination angle control instrument for screw anchor installation can be spread and retracted more conveniently, thereby improving the working efficiency of the inclination angle control instrument for screw anchor installation.

Specifically, each of the transmission assemblies 5 includes a first sleeve 501 hinged to a corresponding one of the side plates 2. The first sleeve 501 is in a threaded connection with a second sleeve 502 within an interior of the first sleeve 501, and a rotating column 503 is rotatably provided within the second sleeve 502 in a damping manner. One end of the rotating column 503 which is adjacent to the platform assembly 4 is provided with a universal transmission assembly 504, and the universal transmission assembly 504 is provided with a driven bevel gear 505. The output end of the driving device 6 is provided with a driving bevel gear 506 engaged with the driven bevel gear 505. The universal transmission assembly 504 can be driven to rotate via the rotation of the driving device 6, the rotating column 503 can be driven to rotate via the rotation of the universal transmission assembly 504, and the second sleeve 502 can be driven to rotate via the rotation of the rotating column 503, so that the second sleeve 502 rotates inside the first sleeve 501. Thus, each of the transmission assemblies 5 has a telescopic function, and each of the transmission assemblies 5 can drive the corresponding one of the side plates 2 to move.

Specifically, the universal transmission assembly 504 includes a first rotating disc 5041 fixedly connected to the driven bevel gear 505. A second rotating disc 5042 is fixedly connected to the rotating column 503. And each of the first rotating disc 5041 and the second rotating disc 5042 is provided with protruding columns 5043. The protruding columns 5043 of the first rotating disc 5041 and the protruding columns 5043 of the second rotating disc 5042 are arranged in a staggered manner. And a rotating frame 5044 for connecting with the second rotating disc 5042 is rotatably connected to the platform assembly 4. The protruding columns 5043 can be driven to rotate via the rotation of the first rotating disc 5041. The second rotating disc 5042 is provided with the protruding columns 5043 interleaved with the protruding columns 5043 of the first rotating disc 5041, so that the second rotating disc 5042 can be driven to rotate via the first rotating disc 5041.

Further, the friction between the second sleeve 502 and the rotating column 503 can be adjusted by rotating the adjusting nut 7, so that the rotating column 503 can drive the second sleeve 502 to rotate.

Further, for each of the side plates 2, the side plate is provided with a small screw anchor 8 which is capable of inserting into the ground. A first gear 15 is fixedly connected to the small screw anchor 8. A second gear 16 engaged with the first gear 15 is provided on the side plate 2. The second gear 16 is provided with a sliding column 10 by means of a universal joint 9. The first sleeve 501 is rotatably connected with a rotating drum 11 within the first sleeve. The rotating drum 11 drives the sliding column 10 to rotate via a key fit therebetween and enable the sliding column 10 to slide inside the rotating drum 11. One end of the rotating drum 11 which is away from the universal joint 9 is fixedly connected with protruding blocks 12. And one end of the rotating column 503 which is away from the universal transmission assembly 504 is fixedly connected with a limiting block 13. The limiting block 13 is provided with a latex pad 14. The latex pad 14 moves closer towards the protruding blocks 12 via the limiting block 13, so that the protruding blocks 12 press and deform the latex pad 14. The protruding blocks 12 contact with the latex pad 14, and the protruding blocks 12 press the latex pad 14, so that the rotating column 503 drives the rotating drum 11 to rotate via the latex pad. The rotation of the rotating drum 11 can drive the universal joint 9 to rotate, so that the universal joint 9 can drive the second gear 16 to rotate.

Specifically, the triangular base 1 is provided with retracting mechanisms 17 each for driving the small screw anchor 8 of a corresponding one of the side plates 2 to be retracted into an interior of the corresponding one of the side plates 2. Each of the retracting mechanisms 17 includes a rotating member 1701 rotatably connected to the first gear 15. A bottom of the rotating member 1701 is provided with a protrusion 1702 limiting a position of the rotating member 1701 in an up-down direction of the first gear 15. A third gear 1703 is provided in a middle of the rotating member 1701. Each of the side plates 2 is slidably connected with a rack 1704 engaged with the third gear 1703. A connecting rod 1705 for pushing the rack 1704 to slide is arranged on the triangular base 1. A threaded column 1706 is arranged above the rotating member 1701. Each of the side plates 2 is fixedly connected with a frame 1707, and the threaded column 1706 is in a threaded connection with the frame 1707. When the side plates 2 contact with the ground, the rotating members 1701 can be driven to rotate through cooperation between the respective connecting rods 1705 and the respective racks 1704. The threaded columns 1706 can be driven to rotate through the rotation of the respective rotating members 1701, and the small screw anchors 8 can be driven to move downwards by the rotation of the respective threaded columns 1706. The second gears 16 can be driven to rotate by the rotation of the respective transmission assemblies 5, the first gears 15 can be driven to rotate via the rotation of the respective second gears 16, and the first gears 15 drive the respective small screw anchors 8 to rotate. Thus, the small screw anchors 8 can be penetrated into the ground, and the inclination angle control instrument for screw anchor installation is fixed by the small screw anchors 8, so that the overturning of the instrument is avoided, and the stability of the inclination angle control instrument for screw anchor installation is improved.

Further, each of the side plates 2 is fixedly connected with a smooth column 18, and the rack 1704 slides on the smooth column 18. The movement of the rack 1704 can be guided by providing the smooth column 18.

Further, the platform assembly 4 is provided with a level meter 19. The levelness of the platform assembly 4 can be adjusted by providing the level meter 19.

Further, one end, which is away from the triangular base 1, of one of the side plates 2 is fixedly connected with a top plate 20. The top of the inclination angle control instrument for screw anchor installation can be sealed by providing the top plate 20.

Preferably, the driving device 6 is an electric motor.

In the description of the present disclosure, unless expressly specified and defined otherwise, the terms "mounted", "connected", and "connection" should be understood broadly, for example, the connection may be fixed connection, detachable connection, or integral connection; may be mechanical connection or electrical connection; may be direct connection or indirect connection via an intervening medium; and may also be inner communication of two elements. The specific meanings of the above terms in the present disclosure may be understood on a case-by-case basis for those of ordinary skill in the art.

It will be apparent to those skilled in the art that the disclosure is not limited to the details of the foregoing exemplary embodiments, but can be embodied in other specific forms without departing from the spirit or essential characteristics of the disclosure. Therefore, from any point of view, the embodiments be considered as exemplary and not restrictive. The scope of the disclosure being indicated by the appended claims rather than by the foregoing description, and therefore all changes that come within the meaning and range of equivalency of the claims are intended to be embraced therein. Any reference signs in the claims shall not be construed as limiting the claims referred to.

In addition, it should be understood that although the description is described according to the embodiments, each embodiment does not only include an independent technical solution. This narrative manner of the description is only for clarity. The description should be regarded as a whole by a person skilled in the art, and technical solutions in each embodiment may also be combined appropriately to form other embodiments that can be understood by the person skilled in the art.

What is claimed is:

1. An inclination angle control instrument for screw anchor installation, the inclination angle control instrument comprising:
    a triangular base (1);
    side plates (2) hinged to three sides of the triangular base (1) respectively;
    a platform assembly (4) for placing a screw anchor clamp (3) being arranged above the triangular base (1);
    transmission assemblies (5) arranged on the platform assembly (4), wherein each of the transmission assemblies drives a corresponding one of the side plates (2) to rotate on the triangular base (1); and
    a driving device (6) for driving the transmission assemblies (5) to operate being provided inside the triangular base (1), wherein an output end of the driving device (6) extends to an interior of the platform assembly (4) and is connected to each of the transmission assemblies (5).

2. The inclination angle control instrument for screw anchor installation according to claim 1, wherein each of the transmission assemblies (5) comprises;
    a first sleeve (501) hinged to a corresponding one of the side plates (2);
    a second sleeve (502), wherein the first sleeve (501) is in a threaded connection with the second sleeve (502) within an interior of the first sleeve (501);
    a rotating column (503) rotatably provided within the second sleeve (502) in a damping manner; and
    a universal transmission assembly (504) arranged at one end of the rotating column (503) which is adjacent to the platform assembly (4);
    wherein the universal transmission assembly (504) is provided with a driven bevel gear (505), the output end of the driving device (6) is provided with a driving bevel gear (506) engaged with the driven bevel gear (505).

3. The inclination angle control instrument for screw anchor installation according to claim 2, wherein the universal transmission assembly (504) comprises a first rotating disc (5041) fixedly connected to the driven bevel gear (505);
    a second rotating disc (5042) is fixedly connected to the rotating column (503);
    each of the first rotating disc (5041) and the second rotating disc (5042) is provided with protruding columns (5043), the protruding columns (5043) of the first rotating disc (5041) and the protruding columns (5043) of the second rotating disc (5042) are arranged in a staggered manner; and
    a rotating frame (5044) for connecting with the second rotating disc (5042) is rotatably connected to the platform assembly (4).

4. The inclination angle control instrument for screw anchor installation according to claim 3, wherein the driving device (6) is an electric motor.

5. The inclination angle control instrument for screw anchor installation according to claim 2, wherein an external thread is provided on one end of the rotating column (503) which is adjacent to the universal transmission assembly (504), and
    an adjusting nut (7) for adjusting a damping intensity between the second sleeve (502) and the rotating column (503) is in a threaded connection with the external thread.

6. The inclination angle control instrument for screw anchor installation according to claim 5, wherein the driving device (6) is an electric motor.

7. The inclination angle control instrument for screw anchor installation according to claim 2, wherein for each of the side plates (2), the side plate is provided with a screw anchor (8) which is capable of inserting into ground,
    a first gear (15) is fixedly connected to the screw anchor (8),
    a second gear (16) engaged with the first gear (15) is provided on the side plate (2);
    the second gear (16) is provided with a sliding column (10) by means of a universal joint (9),
    the first sleeve (501) is rotatably connected with a rotating drum (11) within the first sleeve,
    the rotating drum (11) drives the sliding column (10) to rotate via a key fit therebetween and enable the sliding column (10) to slide inside the rotating drum (11),
    one end of the rotating drum (11) which is away from the universal joint (9) is fixedly connected with protruding blocks (12), and
    one end of the rotating column (503) which is away from the universal transmission assembly (504) is fixedly connected with a limiting block (13),
    the limiting block (13) is provided with a latex pad (14), the latex pad (14) moves closer towards the protruding blocks (12) via the limiting block (13), so that the protruding blocks (12) press and deform the latex pad (14).

8. The inclination angle control instrument for screw anchor installation according to claim 7, wherein the driving device (6) is an electric motor.

9. The inclination angle control instrument for screw anchor installation according to claim 2, wherein the driving device (6) is an electric motor.

10. The inclination angle control instrument for screw anchor installation according to claim 1, wherein the triangular base (1) is provided with retracting mechanisms (17) each for driving a screw anchor (8) of a corresponding one of the side plates (2) to be retracted into an interior of the corresponding one of the side plates (2), each of the retracting mechanisms (17) comprises:
a rotating member (1701) rotatably connected to a first gear (15);
a protrusion (1702) arranged at a bottom of the rotating member (1701) for limiting a position of the rotating member (1701) in an up-down direction of the first gear (15);
a third gear (1703) provided in a middle of the rotating member (1701);
a rack (1704) engaged with the third gear (1703) being slidably connected with each of the side plates (2);
a connecting rod (1705) for pushing the rack (1704) to slide being arranged on the triangular base (1);
a threaded column (1706) arranged above the rotating member (1701); and
a frame (1707), wherein each of the side plates (2) is fixedly connected with the frame (1707), and the threaded column (1706) is in a threaded connection with the frame (1707).

11. The inclination angle control instrument for screw anchor installation according to claim 10, wherein each of the side plates (2) is fixedly connected with a smooth column (18), and the rack (1704) slides on the smooth column (18).

12. The inclination angle control instrument for screw anchor installation according to claim 11, wherein the driving device (6) is an electric motor.

13. The inclination angle control instrument for screw anchor installation according to claim 10, wherein the driving device (6) is an electric motor.

14. The inclination angle control instrument for screw anchor installation according to claim 1, wherein the platform assembly (4) is provided with a level meter (19).

15. The inclination angle control instrument for screw anchor installation according to claim 14, wherein the driving device (6) is an electric motor.

16. The inclination angle control instrument for screw anchor installation according to claim 1, wherein one end, which is away from the triangular base (1), of one of the side plates (2) is fixedly connected with a top plate (20).

17. The inclination angle control instrument for screw anchor installation according to claim 16, wherein the driving device (6) is an electric motor.

18. The inclination angle control instrument for screw anchor installation according to claim 1, wherein the driving device (6) is an electric motor.

* * * * *